(12) United States Patent
Beer

(10) Patent No.: US 7,900,854 B2
(45) Date of Patent: Mar. 8, 2011

(54) FILTRATION AND CLEANING SYSTEM FOR SPRINKLER IRRIGATION DROP NOZZLES

(75) Inventor: Gerald Beer, Guymon, OK (US)

(73) Assignee: American Agriculture Products, LLC, Guymon, OK (US)

( * ) Notice: Subject to any disclaimer, the term of this patent is extended or adjusted under 35 U.S.C. 154(b) by 659 days.

(21) Appl. No.: 11/697,781

(22) Filed: Apr. 9, 2007

(65) Prior Publication Data

US 2007/0241214 A1 Oct. 18, 2007

Related U.S. Application Data

(60) Provisional application No. 60/745,069, filed on Apr. 18, 2006.

(51) Int. Cl.
*B05B 1/14* (2006.01)
(52) U.S. Cl. ......... 239/590; 239/575; 239/553; 210/136; 210/409
(58) Field of Classification Search ............... 239/589, 239/590, 590.3, 590.5, 575, 553; 285/95; 251/318, 319, 339; 210/136, 409, 446
See application file for complete search history.

(56) References Cited

U.S. PATENT DOCUMENTS

| | | | |
|---|---|---|---|
| 1,508,480 A | 9/1924 | Skinner | |
| 1,799,941 A * | 4/1931 | Wulle | 285/323 |
| 1,983,634 A * | 12/1934 | Nichols | 239/381 |
| 2,770,498 A | 11/1956 | Filliung et al. | |
| 2,853,390 A * | 9/1958 | McGowan et al. | 426/392 |
| 2,952,412 A * | 9/1960 | Munson | 239/117 |
| 3,747,769 A * | 7/1973 | Brumfield | 210/350 |
| 3,754,651 A * | 8/1973 | Lannoch | 210/106 |
| 3,782,640 A | 1/1974 | Kirschmann | |
| 3,820,758 A | 6/1974 | Berg, Jr. et al. | |
| 4,018,460 A * | 4/1977 | Morris et al. | 285/39 |
| 4,061,873 A | 12/1977 | Berg, Jr. et al. | |
| 4,064,046 A * | 12/1977 | Gilger | 210/94 |
| 4,077,611 A | 3/1978 | Wilson | |
| 4,081,171 A | 3/1978 | Morgan et al. | |
| D248,851 S | 8/1978 | Langlie et al. | |
| 4,676,438 A * | 6/1987 | Sesser | 239/722 |
| 4,699,321 A | 10/1987 | Bivens et al. | |
| 4,717,073 A | 1/1988 | Bielka | |
| 5,004,157 A | 4/1991 | Martell | |
| 5,087,355 A * | 2/1992 | Godec | 210/136 |
| 5,685,486 A | 11/1997 | Spenser | |
| 5,863,443 A | 1/1999 | Mainwaring | |
| 6,353,187 B1 | 3/2002 | Wilson, Jr. | |
| 6,382,525 B1 * | 5/2002 | Santiesteban et al. | 239/222.11 |
| 6,563,055 B1 | 5/2003 | Burdick | |
| 6,575,307 B2 * | 6/2003 | Lockwood | 210/413 |
| 6,583,363 B1 | 6/2003 | Wilson, Jr. | |
| D481,101 S | 10/2003 | Boehrs et al. | |
| D497,972 S | 11/2004 | Reynolds et al. | |
| 6,883,727 B2 | 4/2005 | De Los Santos | |
| 6,997,406 B2 * | 2/2006 | Nelson et al. | 239/723 |
| 7,063,098 B2 * | 6/2006 | Sprague | 137/15.04 |
| 2009/0294341 A1 * | 12/2009 | Beer et al. | 210/111 |

* cited by examiner

*Primary Examiner* — Len Tran
*Assistant Examiner* — Trevor E McGraw

(57) ABSTRACT

A filter for use with overhead sprinkler irrigation systems is disclosed. The filter includes a hollow cylindrical body, a removable screen, and a manually-actuated plunger adjacent the screen. The plunger is positioned for reciprocal movement through a debris outlet between an open, debris-discharging position, and a closed filtering position. The plunger defaults to the closed filtering position by pressurized water flowing through the body. The water is simultaneously filtered through the screen and passes out a clean water outlet while debris accumulates within the body. The plunger may be manually retracted to the open, debris-discharging position at any time, whereby accumulated debris is flushed out of the body through the debris outlet by residual water flowing therethrough.

12 Claims, 4 Drawing Sheets

FILTRATION AND CLEANING SYSTEM FOR SPRINKLER IRRIGATION DROP NOZZLES

This application claims priority to and the benefit of U.S. Provisional Patent App. No. 60/745,069, filed on Apr. 18, 2006, and also incorporates U.S. Pat. No. 5,087,355 by reference.

BACKGROUND OF THE INVENTION

1. Technical Field

The present invention relates in general to water filtration and, in particular, to an improved system, method, and apparatus for filtering water dispensed by sprinkler irrigation systems and purging the filtration system.

2. Description of the Related Art

Sprinkler irrigation systems typically pump water from wells, rivers, lakes, and other open bodies of water. Typically, the water carries dirt, rust, and other debris which clog the orifices of the spray nozzles. Such clogging results in uneven water application on the field. This problem necessitates cleaning the clogged orifices by the user of the irrigation system. It would be advantageous to provide a filter that would prevent the water-borne debris from reaching the nozzles.

Overhead sprinkler irrigation systems are designed to apply a precise application of water on a field by use of nozzles that have orifices sized to a specific water volume output. There are many sizes of nozzles manufactured. It would be advantageous to provide a filter that is compatible with different types of nozzles. Since these systems may be required to operate continuously for days at a time between shutdowns, it would also be advantageous to provide storage space within the filter for an accumulation of debris.

While the prior art is replete with designs for self-cleaning shower heads, self-cleaning filters, and the like, none are entirely suitable for use on overhead sprinkler irrigation systems. The prior art devices, such as those shown in U.S. Pat. Nos. 2,770,498, and 4,717,073, typically include spray diffusers as an integral part of their design. Therefore, they are not compatible with the nozzles already in use on the systems. Additionally, there is no provision for storage of accumulated debris. Moreover, the prior art devices do not allow for passage of the larger particles of debris.

While the filtering device shown in U.S. Pat. No. 4,064,046, allows for connection to different nozzles and for storage of accumulated debris, the need to visually check and manually service it makes it undesirable. Further, the size and configuration of this device makes it impractical for use on an overhead sprinkler irrigation system. Thus, an improved design for filtering water dispensed by sprinkler irrigation systems and cleaning the filtration system would be desirable.

SUMMARY OF THE INVENTION

One embodiment of a system, method, and apparatus for a manually-flushed filter includes a hollow cylindrical body having an inlet at the upper end for connection to a drop pipe on an overhead sprinkler irrigation system. A tubular screen element is positioned within the body and removably attached at the lower end of the body. Should lime deposits accumulate over the perforations of the screen, it can be removed and cleaned. The screen element has a clean water outlet at its lower end for connection to the spray nozzle. A debris outlet is provided in the lower end of the body beside the screen element. A plunger is mounted for reciprocal movement through the debris outlet.

When the overhead sprinkler irrigation system is used, pressurized water flows into the body which may be manually released to flush debris that has accumulated in the body during a previous use. Manual release of the plunger allows the plunger to move downward to seat against the floor of the body sealing off the debris outlet. The pressure required to seat the plunger is significantly lower than the system operating pressure.

The water is then forced through the perforations of the screen, the clean water outlet, and the spray nozzle. Unable to pass through the perforations, the water-borne debris is held within the storage space provided by the filter's hollow body. The debris continues to accumulate until the system is shutdown or is again manually purged. The debris outlet is of sufficient size to allow particles of debris as large as ⅜ inch in size to pass therethrough. This filter is simple and durable in construction, efficient and reliable in operation, eliminates constant maintenance and servicing, and is economical in cost.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
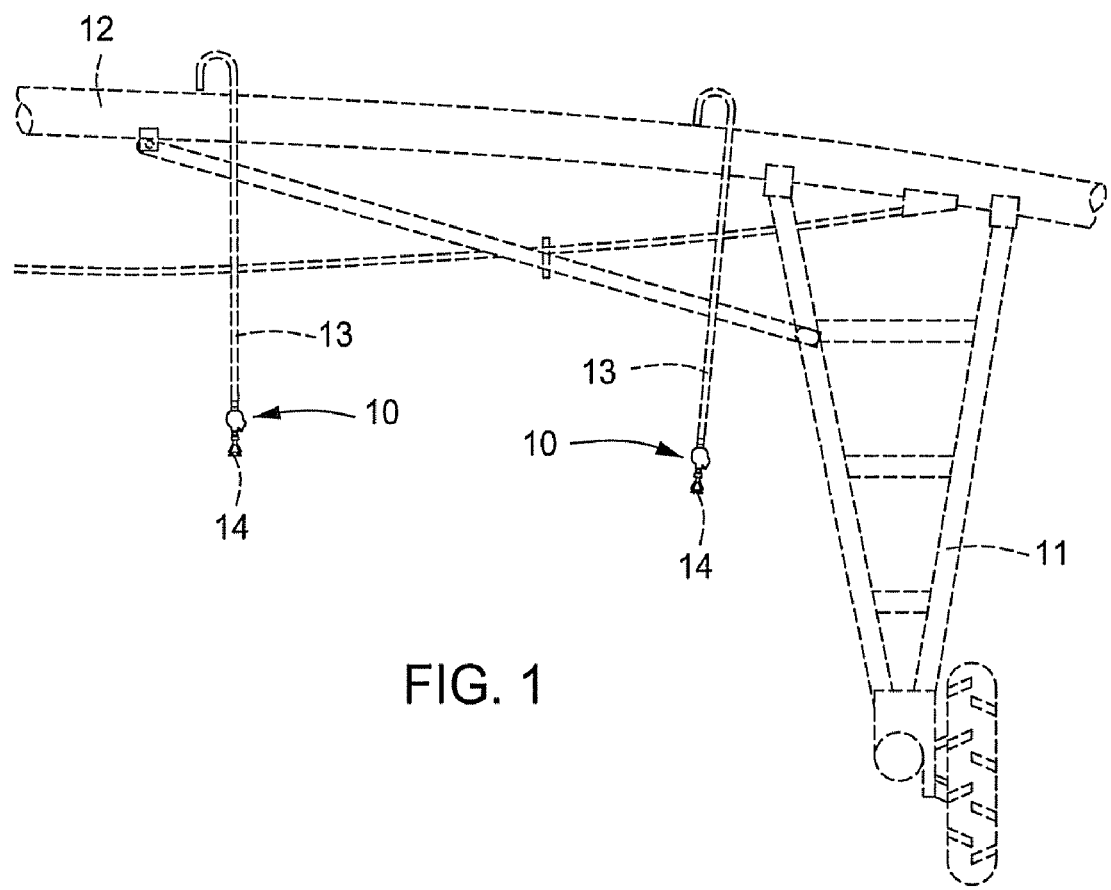
FIG. 1 is a side view of one embodiment of a filter shown installed on a section of an overhead sprinkler irrigation system and is constructed in accordance with the invention.
Figure 2:
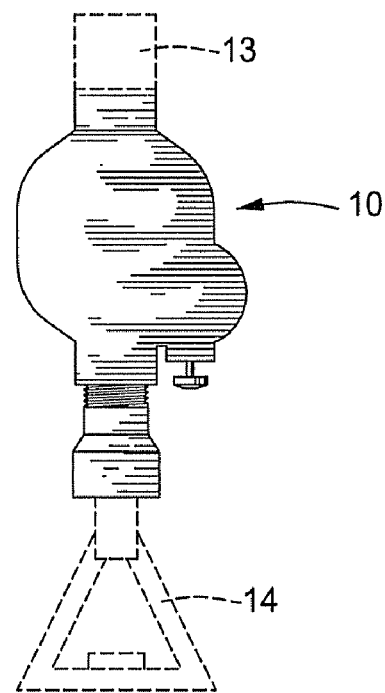
FIG. 2 is an enlarged side view of one embodiment of a filter for the system of FIG. 1 and is constructed in accordance with the invention.
Figure 3:
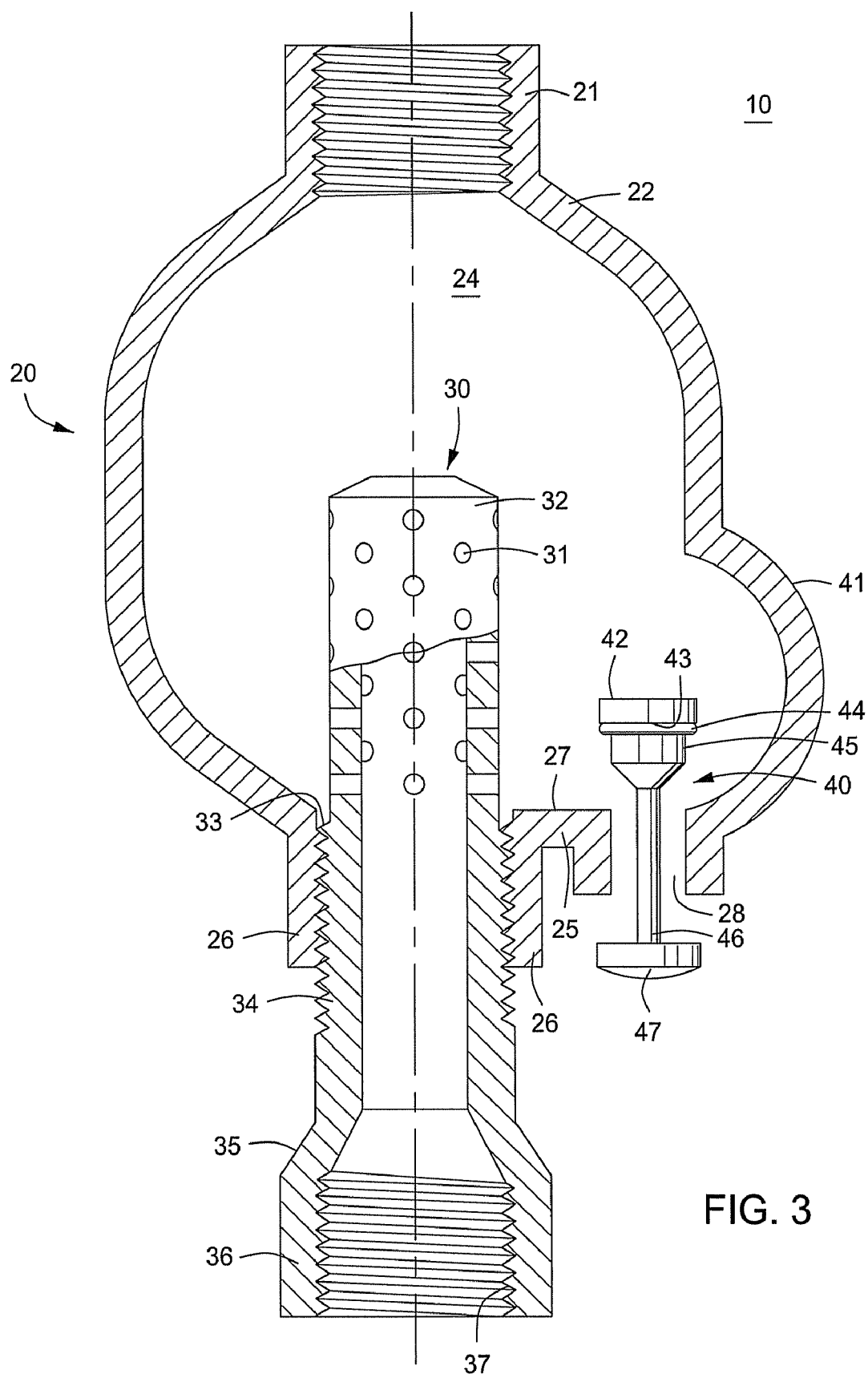
FIG. 3 is a sectional side view of the filter of FIG. 2 showing a plunger in an open position and is constructed in accordance with the invention.

Referring to FIGS. 1-3, one embodiment of the invention includes a filter 10 in one type of contemplated environment. Specifically, the filter 10 is shown installed on a section of an overhead sprinkler irrigation system including a drive unit 11, span pipe 12, and drop pipe 13. A conventional irrigation drop spray nozzle 14, such as those known in the art, is attached to the filter 10. When the irrigation system is in use, water is pumped from one end of the system to the other through the span pipe 12, through the drop pipes 13, the filters 10, and the spray nozzles 14 for irrigating crops and the like.

Referring now to FIG. 3, one embodiment of the invention comprises a hollow, generally cylindrical body 20. At the upper end 22 of the body 20, a neck portion or inlet 21 is provided having female threads thereon to facilitate connection to the drop pipe 13 (see FIGS. 1 and 2). The lower end of the body 20 includes two openings, including a debris outlet 28 and a coupling portion 26, which are provided through the floor 25 of the body 20. The debris outlet 28 provides a gap for the discharge of debris from the body cavity 24, as will be hereinafter described. The coupling portion 26 extends beyond the floor 25 of the body 20 and has a diameter smaller than the diameter of the body 20. The coupling portion 26 has internal female threads and is threadingly mated with the external male threads 34 of a tubular screen element 30.

The removable screen element 30 is threadingly attached to the body 20 at coupling portion 26 in a vertical position as shown. Specifically, the screen element 30 is generally tubular in shape having a closed upper end and an open lower end providing a clean water outlet 37. The screen element 30 includes an upper perforated section 32 and a lower threaded section 35. In one embodiment, the upper perforated section 32 has a plurality of perforations 31 (e.g., circular holes). The size of the perforations 31 varies in proportion to the size of the nozzle orifices on the particular irrigation system. The outside diameter of the threaded section 35 is slightly greater than the diameter of the perforated section 32. An external shoulder 33 is formed between the two sections 32 and 35. The upper end of the threaded section 35 has male threads 34 thereon is threadingly mated with the female threads of coupling portion 26. The lower end of the threaded section 35 is outwardly flanged and downwardly extended to provide a female threaded connection 36 for attachment to a spray nozzle 14 (see FIG. 2).

A plunger 40 is positioned for reciprocal movement through debris outlet 28. Specifically, the head 45 of the plunger 40 is cylindrical and has a diameter approximately equal to the diameter of the debris outlet 28. The upper end of the head 45 is formed with a shoulder 43 which is of enlarged size relative to the head 45. The shoulder 43 serves as a support for an annular sealing gasket 44 (e.g., o-ring) and sealingly engages the internal shoulder 27 formed adjacent the debris outlet 28. The lower end of the head 45 tapers as shown, and an integrally formed stem 46 extends axially downwardly from the head 45 and passes through the debris outlet 28. A diffuser 47 is formed at the lower end of the stem 46. The diffuser 47 has a diameter greater than the diameter of the debris outlet 28. The body 20, screen element 30, and plunger 40 may be formed of a plastic material by a process such as plastic injection molding, or other desirable materials and methods. In one embodiment, the axial movement of plunger 40 is accommodated by a spherical bulge 41 that protrudes from body 20.

In operation, the movable parts of the filter default to or assume a closed position unless sufficient manual upward force is exerted on diffuser 47. In the closed position, the plunger 40 seats against the internal shoulder 27 formed by the debris outlet 28. The diffuser 47 of the plunger 40 hangs downwardly from the debris outlet 28 for normal operation whereby water is discharged through clean water outlet 37.

Pressurized water is introduced into the body 20 through the inlet 21 and passes into the cavity 24 of the body. The water is limited to passing through screen element 30 when the plunger 40 is closed. In the embodiment shown, inlet 21 and screen element 30 are axially aligned. However, when the plunger 40 is manually elevated (as in FIG. 3), water exits through the larger gap formed between the plunger stem 46 and the debris outlet 28 and strikes the diffuser 47. The exiting water from debris outlet 28 flushes out any debris that may remain in the cavity 24 of the body 20 from a prior use.

When the manual upward force is released, the water strikes the diffuser 47 and the pressure area 42 on top of the plunger 40 to force the plunger downward to the closed and sealed position as before. The funnel-shaped design of the plunger head 45 serves to align and center the plunger in the debris outlet 28 during its downward movement.

The downward movement of the plunger 40 is stopped when the annular sealing gasket 44 on the plunger seats against the internal shoulder 27 formed adjacent the debris outlet 28. Thus, in the closed position, the gap at the debris outlet 28 is closed, and the water passes through the perforations 31 in the screen element 30 and exits through the clean water outlet 37. This is the filtering position. Continued water pressure within the body 20 maintains the filtering position of the elements as described.

While in the filtering position, the pressurized water passes through the perforations 31 in the screen element 30. Simultaneously, all water-borne debris that is larger than the size of the perforations 31 is held within the cavity 24 of the body 20 and accumulates until the water supply is turned off. The plunger 40 will remain in the lower, closed position when the water supply is turned off and the water pressure subsides. The large size of the diffuser 47 prevents the entire plunger 40 from being retracted into the body cavity 24. The water remaining in the irrigation system can be allowed to flow through the body 20 of the filter 10 expelling accumulated debris from the cavity 24 through the widened gap between the plunger stem 46 and the debris outlet 28. The plunger 40 is permitted lateral (sideways) play, so that the plunger stem 46 can be pushed against the edge of the debris outlet 28 by exiting water and debris. Thereby, the gap is widened further allowing larger debris to pass from the body 20.

Figure 4:
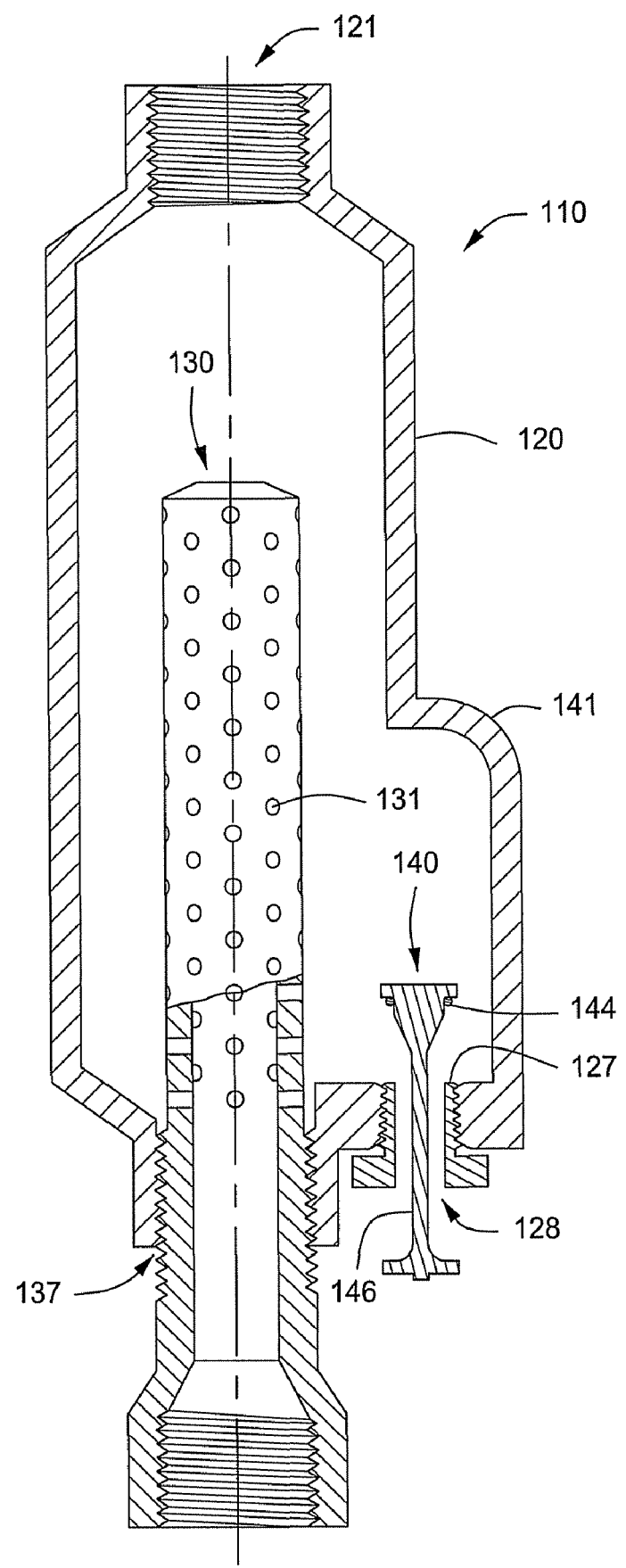
FIG. 4 is a sectional-side view of another embodiment of a filter showing a plunger in an open or purge position and is constructed in accordance with the invention.

In another embodiment (FIGS. 4 and 5), the invention comprises a filter 110 that filters water for irrigation nozzles with an elongated hollow body 120 having a fluid inlet 121 with, for example, ¾-inch female threads. Body 120 is approximately 7-inches long and has a maximum diameter of about 2.25-inches near its lower end at bulge 141. A clean water outlet 137 with ¾-inch female threads is axially aligned with and opposite the fluid inlet 121 to allow axial delivery of fluid therethrough. A debris outlet 128 is located adjacent the clean water outlet 137 and is radially spaced apart therefrom with respect to the axis. The axial alignment between inlet 121 and outlet 137 allows the unit to hang straight down during operation to facilitate a more even watering pattern than previous designs.

An elongated fluid filter 130 with ¾-inch external male threads is threadingly secured in the clean water outlet 137 for filtering water that passes therethrough and the clean water outlet 37. The filter 130 protrudes about 4-inches into the interior cavity of body 120, which is longer than earlier models. In addition, a clean out assembly comprising a plunger 140 is located in the debris outlet 128 for selectively permitting water to pass through the debris outlet 128. In one embodiment, the axial movement of the plunger 140 is accommodated by a spherical bulge 141 in body 20. In both width and depth, bulge 141 protrudes from body 20 by about ¾-inch in each direction. Bulge 141 is optional, such that body 120 may be symmetrically formed without it.

In one embodiment, the plunger 140 comprises a seal 144 on a shoulder 143 for sealing against a fitting 127 threadingly mounted in the hollow body 120 at the debris outlet 128. In one embodiment, fitting 127 has ½-inch external make threads that engage and seal against ½-inch internal female threads in body 120 at the debris outlet 128. Fluid pressure is exerted on the upper end 142 of the plunger 140 to bias the plunger 140 to a closed position. The plunger 140 is manually actuated between an open position (i.e., FIG. 4, pushed upward) wherein water and debris collected inside the hollow body 120 is flushed through the debris outlet 128, and a closed position (i.e., both gravity-induced and water pressurized downward, thus a default position) wherein water is only allowed to exit the hollow body 120 through the fluid filter 130 and the clean water outlet 137. The manual purging of collected debris requires only a few seconds.

Figure 5:
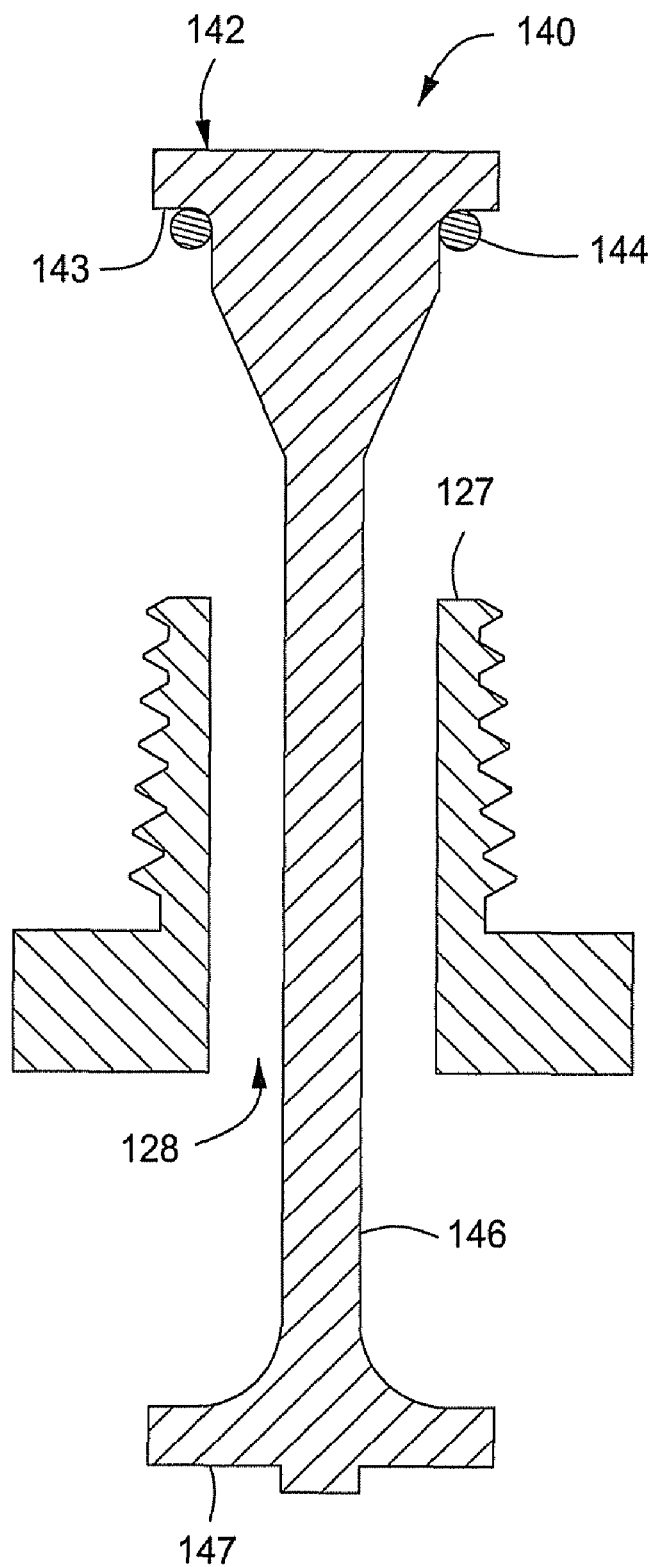
FIG. 5 is a sectional side view of one embodiment of a clean out assembly for the filter of FIG. 4 and is constructed in accordance with the invention.

In the illustrated embodiment, the plunger 140 comprises a ¼-inch diameter stem 146 and upper and lower ends 142, 147 mounted to the stem 146. As shown in FIG. 5, the stem 146 is tapered or flares radially outward at ends 142, 147 to guide the plunger with respect to respective apertures in debris outlet 128. The stem diameter is smaller than a diameter of the debris outlet 128, and the upper and lower ends 142, 147 have diameters that are greater than the diameter of the debris outlet 128. The bulge area 141 of the hollow body 120 adjacent the debris outlet 128 collects any debris from the water when the debris outlet 128 is closed. The fluid filter 130 threadingly engages the hollow body 120 at clean water outlet 137 and is removable therefrom. The hollow body 120 has an upper diameter of no more than 2 to 2.25-inches, as opposed to the 3-inch diameter of earlier models. In one embodiment, the fluid filter 130 comprises a tube with circular holes 131 having a diameter of about 1/16-inch. Other features of the filter 110 are similar to those described above for filter 10.

While there has been shown and described particular embodiments of this invention, it is understood that various changes, substitutions of equivalents, and other alterations can be made without departing from the spirit and scope of the invention. Further, while the application of the invention cited herein has been to overhead sprinkler irrigation systems, it shall not be limited to such use. Therefore, the scope of the invention should be determined by the appended claims.

What is claimed is:

1. A system for filtering water for irrigation nozzles, comprising:
    a hollow body having an axis, a fluid inlet, a clean water outlet having a clean water outlet axis that is co-axial with the axis and opposite the fluid inlet to allow axial delivery of fluid therethrough, and a debris outlet adjacent the clean water outlet and radially spaced apart therefrom with respect to the axis;
    a fluid filter located in the clean water outlet for filtering water that passes therethrough and the clean water outlet;
    a plunger located in the debris outlet and having an open position for selectively permitting water and debris to pass through the debris outlet, and a closed position for sealing the debris outlet, the plunger defaulting to the closed position; and
    female threads located in the debris outlet, a fitting having male threads engaged to the female threads in the debris outlet, and the plunger seats against the fitting in a closed position.

2. A system according to claim 1, wherein the plunger is uncoupled to the body and only contacts the body at the debris outlet, the plunger comprises a seal on an upper end for sealing against an interior of the hollow body to close the debris outlet, and fluid pressure exerted on the upper end of the plunger biases the plunger to a closed position.

3. A system according to claim 1, wherein the plunger is manually actuated from the closed position to the open position, and in the open position, water and debris collected inside the hollow body flushes through the debris outlet, and in the closed position water is only allowed to exit the hollow body through the fluid filter and the clean water outlet.

4. A system according to claim 1, wherein the plunger comprises a stem and upper and lower ends mounted to the stem, the stem having a stem diameter that is smaller than a diameter of the debris outlet, and the upper and lower ends having diameters that are greater than the diameter of the debris outlet.

5. A system according to claim 1, wherein a portion of the hollow body adjacent the debris outlet comprises a spherical bulge, axial movement of the plunger is accommodated by the spherical bulge, the spherical bulge collects any debris from the water when the debris outlet is closed, and the fluid filter threadingly engages the hollow body and is removable therefrom.

6. A system according to claim 1, wherein the hollow body has a diameter of no more than 2.25 inches, and the fluid filter comprises a tube with holes having a diameter of 1/16-inch.

7. A water filter for filtering water in irrigation systems, comprising:
    a hollow body having an axis, a fluid inlet, a clean water outlet having a clean water outlet axis that is co-axial with the axis and opposite the fluid inlet to allow axial delivery of fluid therethrough, and a debris outlet adjacent the clean water outlet and radially spaced apart from the axis;
    a fluid filter mounted to the clean water outlet and having holes for allowing water to pass through the fluid filter to the clean water outlet;
    a clean out assembly mounted in the debris outlet and having a plunger that is movable between a closed position for sealing the debris outlet in a default position, and an open position for passing water and debris through the debris outlet;
    the plunger is manually actuated from the closed position to the open position to allow debris collected inside the body to be released through the debris outlet, and in the closed position water is allowed to exit the body only through the fluid filter and the clean water outlet; and
    the clean out assembly has a fitting mounted in the debris outlet, and the plunger has a seal on an upper end for sealing against the fitting in the closed position.

8. A water filter according to claim 7, wherein the plunger is uncoupled to the body and only contacts the body at the debris outlet, the plunger comprises a stem and upper and lower ends mounted to the stem, the stem having a stem diameter that is smaller than a diameter of the debris outlet, and the upper and lower ends having diameters that are greater than the diameter of the debris outlet.

9. A water filter according to claim 7, wherein the fluid filter threadingly engages the hollow body and is removable therefrom, the hollow body has an outer diameter of no more than 2.25-inches, the fluid filter comprises a tube with holes having a diameter of 1/16-inch, a portion of the body adjacent the debris outlet comprises a spherical bulge, axial movement of the plunger is accommodated by the spherical bulge, and the spherical bulge collects any debris from the water when the debris outlet is closed.

10. A water filter according to claim 7, further comprising female threads located in the debris outlet, and the fitting has male threads engaged to the female threads in the debris outlet, and the plunger seats against the fitting in a closed position.

11. A water filter for filtering water in irrigation systems, comprising:
    a hollow body having an axis, a fluid inlet, a clean water outlet having a clean water outlet axis that is co-axial with the axis and opposite the fluid inlet to allow axial delivery of fluid therethrough, and a debris outlet adjacent the clean water outlet and radially spaced apart from the axis, the debris outlet having female threads;

a fluid filter mounted to the clean water outlet and having holes for allowing water to pass through the fluid filter to the clean water outlet;

a clean-out assembly mounted in the debris outlet and having a fitting with male threads engaged with the female threads of the debris outlet, a plunger that is movable between a closed position for sealing against the fitting in a default position to close the debris outlet, and an open position for passing water and debris through the debris outlet, the plunger defaulting to the closed position and being uncoupled to the body, and the plunger only contacting the body at the debris outlet;

a portion of the body adjacent the debris outlet comprises a spherical bulge, axial movement of the plunger is accommodated by the spherical bulge, and the spherical bulge collects any debris from the water when the debris outlet is closed;

the plunger is manually actuated from the closed position to the open position to allow debris collected inside the body to be released through the debris outlet, and in the closed position water is allowed to exit the body only through the fluid filter and the clean water outlet; and the plunger has a stem and flared upper and lower ends mounted to the stem, the stem has a stem diameter that is smaller than a diameter of the debris outlet, and the upper and lower ends have diameters that are greater than the diameter of the debris outlet.

12. A water filter according to claim 11, wherein the fluid filter threadingly engages the hollow body and is removable therefrom, the hollow body has an outer diameter of no more than 2.25-inches, and the fluid filter comprises a tube with holes having a diameter of 1/16-inch.

* * * * *